United States Patent [19]
Aharoni et al.

[11] Patent Number: 5,225,244
[45] Date of Patent: Jul. 6, 1993

[54] POLYMERIC ANTI-REFLECTION COATINGS AND COATED ARTICLES

[75] Inventors: Shaul M. Aharoni, Morris Plains; Michael J. McFarland, Washington; Ajay Nahata, Chatham; James T. Yardley, Morristown, all of N.J.

[73] Assignee: Allied-Signal Inc., Morris Township, N.J.

[21] Appl. No.: 930,886

[22] Filed: Aug. 14, 1992

Related U.S. Application Data

[60] Division of Ser. No. 783,032, Oct. 25, 1991, Pat. No. 5,178,955, which is a continuation-in-part of Ser. No. 628,541, Dec. 17, 1990, Pat. No. 5,061,769.

[51] Int. Cl.[5] .............................................. B05D 3/12
[52] U.S. Cl. .................................. 427/240; 427/385.5; 427/407.1; 427/430.1
[58] Field of Search .................. 427/240, 385.5, 407.1, 427/430.1

[56] References Cited

U.S. PATENT DOCUMENTS

| | | |
|---|---|---|
| 3,491,169 | 1/1970 | Raynolds et al. . |
| 3,547,856 | 12/1970 | Tandy et al. . |
| 3,910,187 | 10/1975 | Cords . |
| 4,130,706 | 12/1978 | Plambeck, Jr. . |
| 4,293,674 | 10/1981 | Andrews . |
| 4,296,224 | 10/1981 | Fukui et al. . |
| 4,644,043 | 2/1987 | Ohmori et al. . |
| 4,650,843 | 3/1987 | Yokoyama et al. . |
| 4,791,166 | 12/1988 | Saukaitis . |
| 4,812,337 | 3/1989 | Sugimura et al. . |
| 4,833,207 | 5/1989 | Kinaga et al. . |

FOREIGN PATENT DOCUMENTS

| | | |
|---|---|---|
| 0121140 | 10/1984 | European Pat. Off. . |
| 0182516 | 5/1986 | European Pat. Off. . |
| 0234601 | 9/1987 | European Pat. Off. . |
| 2151035 | 2/1973 | Fed. Rep. of Germany . |
| 02155133 | 5/1973 | France . |
| 44-851 | 1/1969 | Japan . |
| 56-118408 | 9/1981 | Japan . |
| 57-51705 | 3/1982 | Japan . |
| 60-258218 | 12/1985 | Japan . |

Primary Examiner—Joseph L. Schofer
Assistant Examiner—N. Sarofim
Attorney, Agent, or Firm—Gerhard H. Fuchs; Richard C. Stewart

[57] ABSTRACT

Solid bodies having a reflective surface are provided with an anti-reflection coating of a terpolymer composition derived from (a) perfluoroalkylalkyl acrylate or methacrylate, (b) acrylic, methacrylic or itaconic acid, and (c) hydroxyl- containing acrylate or methacrylate.

10 Claims, 6 Drawing Sheets

POLYMERIC ANTI-REFLECTION COATINGS AND COATED ARTICLES

CROSS REFERENCE TO RELATED APPLICATION

This application is a division of application Ser. No. 783,032, filed Oct. 25, 1991, now U.S. Pat. No. 5,178,955.

FIELD OF THE INVENTION

This invention relates to the field of optical coatings for reducing reflection on reflective surfaces, such as optical surfaces, windows, transparent films, display surfaces, glossy photographs and the like. It provides coatings of curable optically clear fluoropolymer having low refractive index.

BACKGROUND OF THE INVENTION

In any optical element, a percentage of the incident light is reflected at each surface. The exact amount is determined by the refractive index change at the dielectric interface. There are four main reasons why anti-reflection coatings are desirable in optical systems. First, the percentage of reflected light is lowest at normal incidence. The percentage increases with a corresponding increase in the angle of observation. This limits the resolution of the image and, in some cases, can completely obscure the image. Second, an increase in reflected light corresponds to a decrease in transmitted light. For components such as compound lenses, this loss is multiplicative and may be intolerable. Third, reflections from optical surfaces often create unwanted or distracting glare. Finally, for components such as camera lenses and photographs, that contain many optical surfaces, there are multiple internal reflections. These reflections can cause stray light to hit the image plane and thereby reduce the image contrast and definition.

It has been well known for many years that unwanted reflections can be substantially reduced by providing a surface coating of an optically clear coating material having a refractive index which is lower than the refractive index of the substrate. However, difficulty in producing high quality thin films prevented significant practical application until approximately 1940, when the technology for the creation of thin films of various refractory inorganic materials via evaporation under high vacuum conditions was developed. In more recent times, low refractive index polymeric coatings, generally fluoropolymer coatings, have been provided for anti-reflection applications. Generally, these coatings, for maximum effectiveness, are about ¼ wavelength thick. The basic theory of such anti-reflection coatings is well known; the technical challenge is in the provision of conveniently applied, effective, strongly adherent, scratch-resistant and relatively low cost coatings with optimally low refractive index.

SUMMARY OF THE INVENTION

This invention provides devices comprising a reflective substrate having deposited thereon as an anti-reflection coating a thin film of copolymer of fluorine-containing acrylic monomers with non-fluorinated acrylic monomers. Such copolymer can be made under free-radical polymerization conditions. These copolymers are amorphous and optically clear, and have low refractive indexes. Being soluble in specific organic solvents, their solutions can be used to cast anti-reflection coatings, which can be cured by cross-linking. These coatings are strongly adherent to substrates, including glass, polymers, polymer films and crystal substrates. These copolymer anti-reflection coatings combine the superior properties of fluoropolymers—such as low refractive index and surface energy, good thermal and chemical resistance—with strong adhesion, flexibility, toughness, and abrasion resistance. Moreover, they can be easily applied from solution, and they are readily cured by cross-linking. They are suitable for application to very large area substrates at relatively low cost.

In accordance with the present invention, there are provided devices comprising a reflective substrate having deposited thereon as an anti-reflection coating an effective layer of a polymeric composition comprising fluorinated copolymer having the general composition

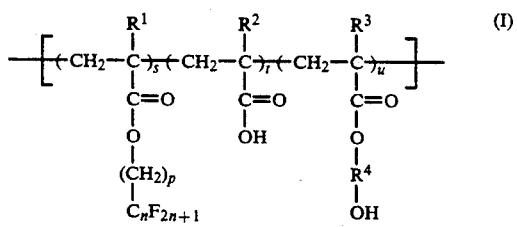

wherein
$R^1$ is H, $-CH_3$, or mixtures thereof;
$R^2$ is H, $-CH_3$, or $-CH_2COOH$;
$R^3$ is H, $-Ch_3$, or $-CH_2COOC_mH_{2m+1}$,
wherein m is an integer of from about 1 to about 4;
$R^4$ is an alkylene bridging group, straight chain, branched or cyclic, having from 1 to about 8 carbon atoms;
p is 1 or 2;
s, t and u represent weight proportions of the respective monomer-derived units, and have values within the ranges of
s = from about 0.5 to about 0.99;
t = from about 0.005 to about 0.495; and
u = from about 0.005 to about 0.495;
with the sum of s+t+u being 1; and
n is an integer of from about 1 to about 40;
wherein the monomer-derived units may be arranged in any sequence. In the above formula, t and u may, but need not be the same.

The term copolymer, as used in the specification and claims, is intended to refer to a polymer derived from at least two or more, usually derived from at least three different monomer units. There is no theoretical limit on the number of different monomer units which may be incorporated into the polymeric compositions forming the anti-reflection coatings for the optical devices of the present invention; their number is limited only by the usual practical limitations imposed by polymerization process considerations, and the desire to obtain polymer products having useful properties.

The polymeric compositions forming the anti-reflection coatings for the optical devices of the present invention may also be described as being made up of a polymer chain composed of

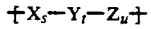
(II)

units wherein s, t and u have the meanings given above in connection with formula (I), and wherein X represents monomer-derived units of the composition

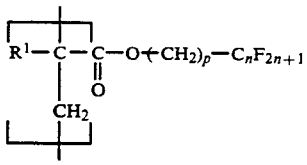
(III)

wherein $R^1$, p and n, which may be the same or different in individual X units within the polymer chain, have the meanings given in connection with formula (I), above;

Y represents monomer-derived units of the composition

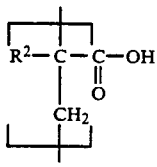
(IV)

wherein $R^2$, which may be the same or different in individual Y units within the polymer chain, has the meaning given in connection with formula (I), above; and Z represents monomer-derived units of the composition

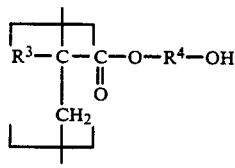
(V)

wherein $R^3$ and $R^4$, which may be the same or different in individual Z units within the polymer chain, also have the meanings given in connection with formula (I), above.

In the polymeric compositions of formula (II), above, the X, Y and Z units may be arranged in any sequence. This freedom of arrangement accordingly also prevails for formula (I), above, since formulas (I) and (II) are merely alternate expressions for the same polymeric compositions.

These copolymers can be prepared by polymerizing the monomers in tetrahydrofuran ("THF") or glacial acetic acid at elevated temperature with a free-radical generating initiator, using procedures conventionally employed in making acrylic and methacrylic polymers.

These copolymers are generally optically clear, without haze or inhomogeneities. They have refractive indexes below about 1.4, generally within the range of from about 1.365 to below about 1.4; good adhesion to glass, silicon, copper foil, polyimide, nylon, polyethylene terephthalate, polytetrafluroethylene, polychlorotrifluoroethylene and other similar substrates; low surface energy, about half that of polytetrafluoroethylene; excellent thermal stability in air; in combination with good mechanical properties—they are neither brittle nor elastomeric. They are soluble (up to about 40 percent by weight of the combined weight of polymer and solvent) in about 1:1 THF/1,3-bis(trifluoromethyl)benzene (hereinafter also referred to as hexafluoroxylene). From such solutions, coatings can be applied to any suitable substrate, particularly optical substrates, such as glass, polymers, polymer films, crystals, and the like. Their dielectric constant is on the order of about 3.

It is an important feature of these copolymers that they can be cross-linked by heat treatment without the use of cross-linking agents. Such heat-induced cross-linking can occur either through internal anhydride formation between two internal carboxyl groups situated on pendant groups of monomer-derived moieties; or by internal esterification between hydroxyl and carboxyl groups. Heat-induced cross-linking has the advantage that no cross-linking agent is required, so that no impurities are introduced; the cured polymer is a single component with no residual solvent, monomer or cross-linking agents. The cross-linking process is not associated with creation of large voids which can establish optical scattering sites in the polymer. Such cross-linking improves hardness, scratch resistance and adhesion of the polymer film, without change in refractive index, and without deleterious effect on any other desirable property. Heat treatment within the temperature range of from about 130° C. to about 150° C. for time periods of from about 0.25 to about 10 hours, desirably of from about 1 to 4 hours, results mainly in esterification; heat treatment at higher temperatures, say within the range of from about 170° C. to about 180° C., results in significant anhydride formation. As a general proposition, higher temperatures and longer heat treatment times tend to promote anhydride formation. Cross-linking agents may also be employed, if desired, as to be discussed in further detail below.

The unique properties of these copolymers which make them so eminently suitable for use as anti-reflection coatings for optical devices are due to the presence of the fluorinated moiety in combination with moieties bearing carboxyl groups and moieties bearing hydroxyl groups. The fluorinated moieties provide the desirable properties of fluoropolymers, and the combination of the carboxyl groups and the hydroxyl groups provides for processability and curability, properties which are typically lacking in conventional fluoropolymers.

Anti-reflection coatings of the above-described copolymers are conveniently applied to optical substrates, typically in ¼ wavelength thickness, by coating the substrate with a solution of the copolymer, removing excess solution, if any, drying by evaporating the solvent, preferably, but not necessarily, followed by heat-treatment, as above described, to cure the coating by means of cross-linking. Typical substrates include optical lenses; eyeglasses, both plastic and glass; windows, glass as well as polymeric windows, such as windows of clear polymeric vinyl (incl. copolymers thereof), styrene, acrylics (Plexiglass) or polycarbonate (Lexan ®) supplied by General Electric); clear polymer films such as vinyl (incl. copolymers), nylon, polyester, and the like; the exterior viewing surface of liquid crystal displays, cathode ray tubes (e.g. video display tubes for televisions and computers); and the like; the surface of glossy displays and pictures, such as glossy prints and photographs; and the like. Determination of suitable coating thickness (generally ¼ wavelength of the light of which reflection is to be minimized) is within the ordinary skill of the art, but is further elucidated, infra.

BRIEF DESCRIPTION OF THE DRAWINGS

The present invention may be better understood with reference to the annexed drawings, wherein.

DETAILED DESCRIPTION OF THE INVENTION

Figure 1:
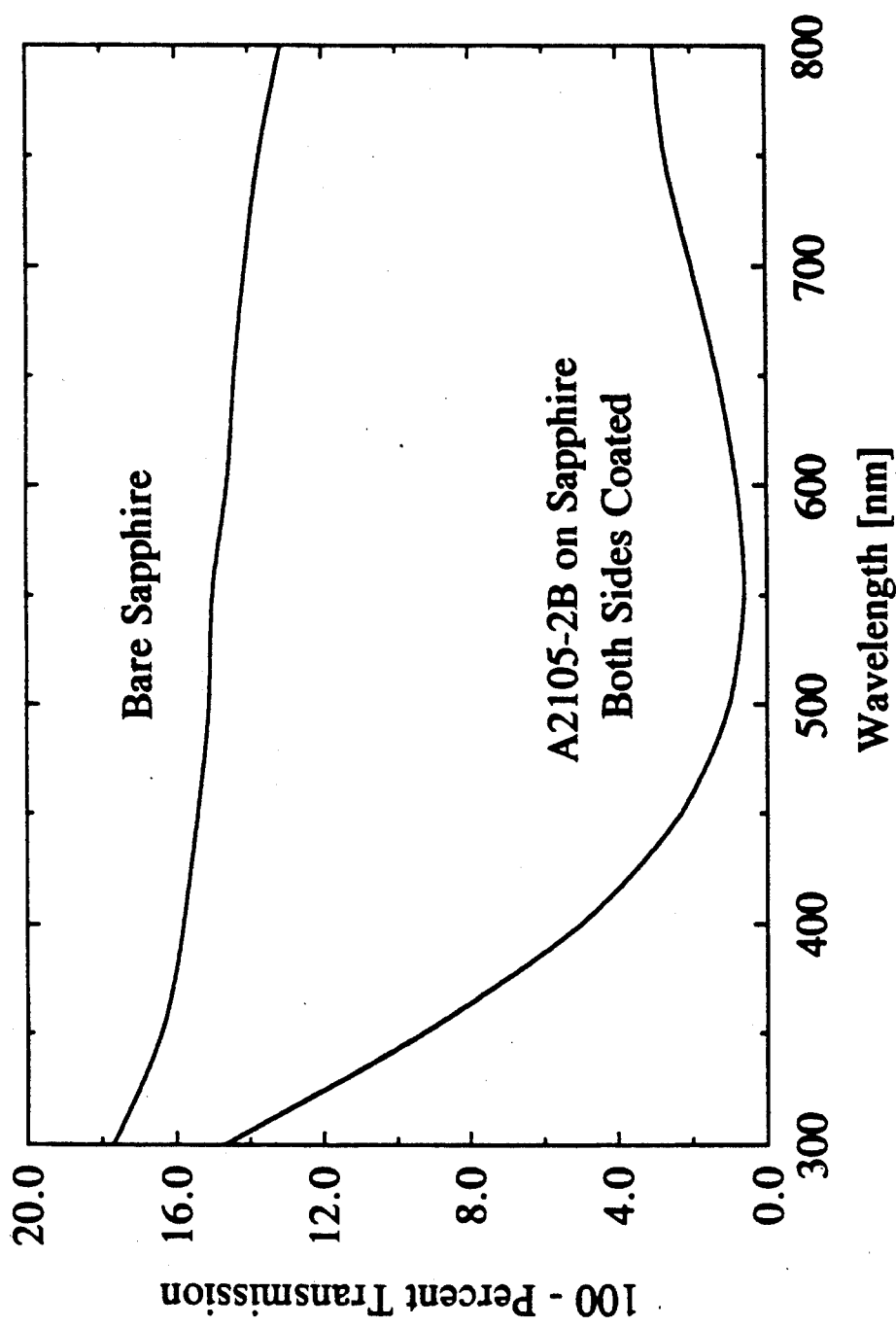
FIG. 1 represents a graph showing total reflectance from an uncoated and coated sapphire (a 1000 Angstrom layer of the terpolymer was spun on both sides of the substrate)

The following detailed description sets forth the preferred embodiments and the best mode presently contemplated for its practice.

Regarding the copolymer composition, with reference to the "X" units of formula (II), above, which are in more detail defined by formula (III), above, these are derived from fluorine-containing acrylate or methacrylate monomers of the formula

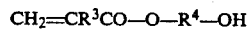

wherein $R^1$, p and n have the meanings given above in connection with formula (I). Those monomers wherein p is 2 are commercially available, as mixtures of homologues having perfluoroalkyl groups of varying chain length, that is to say as mixtures differing in "n", as they are usually obtained in commercial manufacturing operations. Of course, one could separate out individual compounds of defined perfluoroalkyl chain length, if it were desired for any reason. For use in the anti-reflections coating of the present invention, it is preferred to use monomers having a wider distribution of "n", since such wider distribution makes for better amorphicity, hence greater optical clarity, as will the use of acrylates (wherein in the above formula $R^1$ is H) with methacrylates (wherein in the above formula $R^1$ is $CH_3$). Those monomers wherein p is 1 can be readily prepared using known procedures. Preferably, p is 2 and n is an even number. In preferred embodiments, n ranges from about 2 to about 30, more preferably from about 4 to about 20. Specific examples of preferred embodiments are the products sold by DuPont under its "Zonyl" trademark, e.g. Zonyl TM (the methacrylate) and Zonyl TA-N (the acrylate), and sold by Hoechst-Celanese under its "NUVA-HF" trademark. Such specific examples include mixed perfluoroalkyl alkyl acrylates and methacrylates wherein n is predominantly an even number, and in particular wherein the perfluoroalkyl group is represented by a mixture of $C_4$ through $C_{20}$ groups, particularly $C_6$, $C_8$, $C_{10}$ and $C_{12}$ groups.

The "Y" units of formula (II), above, which are in more detail defined by formula (IV), above, are derived from acrylic acid, methacrylic acid, itaconic acid, or mixtures thereof. All of these are commercially available products.

The "Z" units of formula (II), above, which are in more detail defined by formula (V), above, are derived from acrylic acid esters of the formula

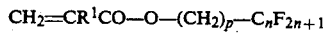

wherein $R^3$ and $R^4$ have the afore-stated meanings. In more preferred embodiments, $R^3$ is H or $—CH_3$, with $—CH_3$ being most preferred. If $R^3$ is represented by $—CH_2C_mH_{2m+1}$, then m is preferably an integer of from about 0 to about 6, more preferably of from about 1 to about 4. With respect to the $R^4$ alkylene bridging group, embodiments having from 2 to about 4 carbon atoms are preferred, as are the linear and branched chain embodiments. Use of mixtures of such monomers of differing carbon-carbon chain length is contemplated. To enhance amorphicity, use of mixtures of such monomers of differing carbon-carbon chain length is desirable and preferred. Many of the esters suitable for furnishing the "Z" units of formula (II), above, are commercially available; those not so available are readily prepared by those skilled in the art, using well-known procedures.

With regard to the weight proportions of the "X", "Y" and "Z" units (see formula II, above), s ranges from about 0.5 to about 0.99, and t and u, which may be the same or different, each range from about 0.005 to about 0.495. The preferred range for t + u is from about 0.02 to about 0.35, with values in the range of from about 0.08 to about 0.3 being more preferred yet. As to the weight ratio between t and u (t:u), weight ratios in the range from about 1:0.5 to about 1:1.5 are preferred, with ratios in the range of from about 1:0.8 to about 1:1.2 being more preferred yet. Polymeric compositions of the present invention containing approximately equal proportions by weight of the "Y" and "Z" components have been shown to have desirable properties. If it is contemplated to subject the polymeric composition to heat-induced cross-linking, as is preferred to obtain more robust anti-reflection coatings, then the Y and Z components are desirably employed in about equimolar proportions (rather than in about 1:1 weight ratio). If equimolar proportions are employed, then the cross-linking process, as above described, proceeds predominantly by the internal esterification route, with minimal anhydride formation. The esterification route is preferred because of the better stability of the resultant product in high temperature and humid environments.

Polymerization of the monomers to make the polymeric compositions for the anti-reflection coatings of this invention proceeds readily in solution in THF or glacial acetic acid, at elevated temperature within the range of from about 35° C. to the boiling point of the polymerization mixture, more desirably within the range of from about 45° C. to the atmospheric pressure boiling point of the solvent, about 65° C. for THF and about 110° C. for glacial acetic acid, under autogenous pressure, typically atmospheric pressure, using a free radical generating initiator, such as 2,2′-azobis(2-methylpropanenitrile) (CAS #78-67-1) available from DuPont under the designation VAZO 64, hereinafter referred to as "AIBN". Other suitable initiators include 2,2'-azobis(2,4-dimethylpentanenitrile) (CAS #4419-11-8) and 2,2'-azobis(2-methylbutanenitrile) (CAS #13472-08-7). The 2,2'-azobis(2-methylpropanenitrile) is preferred.

The catalyst is employed in amount of from about 0.15 to about 0.4 percent by weight, based on the combined weight of all the monomers to be polymerized. Desirably, polymerization is conducted under agitation. Typical polymerization times range from about 4 hours to about 8 hours. The monomer concentration in the reaction medium typically ranges from about 25 to about 50 percent by weight, based on the combined weight of reaction medium (THF or glacial acetic acid) and the monomers.

Upon conclusion of the polymerization reaction, the polymer product is readily recovered from the reaction mixture, as by evaporation of the solvent and/or cooling the mixture to precipitate the polymer product, followed by separation of liquid and solid phases, as by filtration, and washing of the polymer product to remove residual unreacted monomers using any suitable solvent, if desired. These operations are conventional. Once recovered and purified, as here described, the polymer product seems to be insoluble in the polymerization mixture. However, it is nicely soluble in about equal volumes of THF and hexafluoroxylene, in concentrations of up to about 40 percent by weight, based on the combined weight of polymer product and solvent. Neither THF nor hexafluoroxylene by itself dissolves the polymer product. Solution of the polymer product in the mixed solvent is aided by mild heating and agitation.

The appended claims are intended to cover antireflection coated optical devices wherein the polymeric compositions contain incidental amounts, say up to about 10% by weight of other comonomers, and particularly of acrylic esters, which do not interfere with the polymerization, and which do not deleteriously affect desirable properties of the polymer product. Examples of such incidental, additional monomeric materials include alkoxy alkyl acrylates and alkoxy alkyl methacrylates (such as methoxy, ethoxy, propoxy, butoxy and higher acrylates and methacrylates); epoxy alkyl methacrylates; alkyl acrylates and methacrylates, including haloalkyl derivatives thereof, such as chloroalkyl acrylates and methacrylates; and the like.

When the ratio of the Y-component (acid component) to the Z-component (hydroxyl- bearing acrylic ester) in the polymeric composition of this invention is larger than 1.0, then the preferred curing product is the anhydride. When the ratio is smaller than 1.0, an ester is the preferred product, with some hydroxyl groups remaining unreacted. When the ratio is 1.0, then the preferred product is the ester, with practically all the hydroxyl groups being consumed.

Example 1, below, illustrates typical polymerization procedure.

Example 1

Typical polymerization procedure for perfluoroalkylethylacrylate terpolymer

A 500 ml 3-neck round bottom flask containing a large magnetic stirring "egg" is immersed in a thermostated oil bath on a stirring hot-plate. A stream of dry nitrogen is introduced through one of the necks to keep the polymerization mixture under nitrogen atmosphere throughout the polymerization. Another neck is stoppered. Through this neck the polymerization initiator is added by momentarily opening the stopper. The third neck is equipped with a pressure-equalizing dropping funnel. On top of this dropping funnel, a long vigeraux condenser is placed equipped on the top with a very narrow exit. Extra solvent is placed in the dropping funnel, which is dropped into the polymerization vessel in order to compensate for loss of solvent which may arise from the combination of nitrogen flow and elevated reaction temperature. With the above arrangement, each drop of solvent (which can also be a solution of a very reactive monomer in the same solvent) is swept by the nitrogen flowing in the opposite direction, i.e., by the dropping exit of the dropping funnel, on top of the solvent in this funnel, up through the vigeraux column and out through the narrow outlet.

The monomers are purified from any polymerization inhibitors that may be present, and the desired proportion is weighed into the round bottom flask. 72.10 g perfluoroalkylethylacrylate monomer mixture (Hoechst-Celanese NUVA FH), 7.34 g acrylic acid and 7.35 g 2-hydroxyethylacrylate are weighed into the flask. Their percentage weights are 83.09% NUVA FH, 8.46% acrylic acid and 8.45% 2-hydroxyethylacrylate. To this mixture, 105 ml tetrahydrofuran (THF) is added. The solution volume should be about half the volume of the round bottom flask. The mixture is stirred under nitrogen flow with very slow heating to about 40° C. for about an hour. Then there are added to the clear solution 0.27 g (0.3% by weight based on total monomer weight) of 2,2'-azobis(2-methylpropanenitrile) (AIBN) (duPont's VAZO 64), a convenient polymerization initiator. The polymerization mixture is slowly brought up to around 62° C. and the polymerization is allowed to proceed for several hours. Then the mixture is poured into a crystallization dish and most of the THF is stripped off. The residual materials are washed and comminuted in methanol, the unreacted monomeric species are washed away and the powdery white polymer is dried under high vacuum at temperatures not exceeding 50° C. The reduced viscosity of a polymer thus prepared was determined in a glass viscometer at 25° C. on a 2% solution of the polymer in 1:1 vol/vol mixture of THF and 1,3-bis(trifluoromethyl)-benzene. A value of $\eta_{red}=0.15$ dL/g was obtained. NMR analysis indicated that the monomer composition in the terpolymer was extremely close to the feed composition. After spinning on silicon wafers and on glass substrates, refractive indices of n=1.3885, n=1.3890 and n=1.3865 were measured on three samples taken at random from a large population.

For the purpose of spin coating, mixtures of THF and 1,3-bis(trifluoromethyl)benzene in the range of 1:3 up to 3:1 were found to be the only acceptable ones, with the most desirable being a 1:1 vol/vol mixture. No other solvent or solvent mixture from which acceptable coatings could be spun using commonly available spinners (e.g., Headway Research, Inc., Photoresist Spinners) under ambient temperature and air humidity conditions has been found.

Preparation of perfluoroalkylethylmethacrylate terpolymer follows the procedure set forth above in Example 1. In general, the intrinsic viscosities of the methacrylates are higher than those of the acrylates, i.e. in the order of about 0.25 dl/g vs. 0.13–0.15 dl/g. THF and glacial acetic acid were found to be suitable solvents to conduct the polymerization. However, two additional solvents were found for the methacrylic monomer mixture polymerization. These are 4-methyl-2-pentanone (MIBK) and 2-butanone (MEK). These solvents are not as good as THF for the purpose of the polymerization and MEK is poorer than MIBK. In MIBK and MEK the polymerizations are conducted at temperatures up to about 80° C., substantially above the 65° C. boiling point of THF. Workup is the same as for the acrylic polymers.

The above mentioned mixture of THF and 1,3-bis(trifluoromethyl)benzene in a preferable ratio of 1:1 vol/vol. ratio is a suitable solvent for spinning or spray-coating the polymers of this invention. A large number of solvents and solvent mixtures were tested for the purpose of spin coating, but only one solvent mixture was found to perform satisfactorily with respect to the high polymer solubility required for spin coating, and the evaporation rate of the solvent after the solution was spun on the substrate, namely the THF/1,3-bis(trifluoromethyl)benzene mixture in ratios of from 1:3 to 3:1, preferably in ratio of about 1:1, by volume.

A typical spin-coating and thermal cross-linking (curing) procedure for perfluoroalkylethyl terpolymer is described in Example 2, below.

Example 2

This example illustrates a coating application employing a fluoropolymer composition of this invention.

The polymer is dissolved in the solvent mixture at a concentration producing a solution of sufficient viscosity for conventional spin coating. For the modest molecular weight polymers in this invention, a polymer concentration of about 20 wt/vol % is usually employed. A few drops of the solution are applied to the center of the substrate (e.g. optical glass) and the system is spun in the spinner for about 30 seconds or less. The speed of spinning varies from ca. 2000 rpm up to over 5000 rpm.

When the spinning process is complete, the coated substrate is removed from the spin-head, placed in an oven and cured at temperatures of 130° C. up to 200° C., preferably between about 130° C. and about 180° C., for 1 to 4 hours. A self-crosslinked coating is obtained. The coating is tenaciously attached to the substrate and is not removed by scratching, masking-tape crosshatch procedure, immersion in solvents or acids, etc. For systems containing over ca. 75 wt. % perfluoroalkylethyl-(meth)acrylate comonomer, the refractive index is, as a rule, less than 1.400.

As previously indicated, the polymeric compositions of this invention can also be cross-linked employing conventional cross-linking agents, such as, for example, diisocyanates, carbodiimides, diacid chlorides, and the like. Examples of specific effective crosslinking agents include hexamethylenediisocyanate, methylene di-p-phenyldiisocyanate, 1,3-dicyclohexyl carbodiimide, dodecanedioyl dichloride and adipoyl chloride. The crosslinking agents are employed in amounts conventionally employed to obtain desired cross-linking of the polymer which, by use of such agents, can take place at ambient temperatures.

To be effective in suppressing the undesired reflection, the anti-reflection coating should have a refractive index less than that of the substrate, or the underlying layer on which the coating is applied, and have the appropriate optical thickness. The optical thickness is defined as the physical coating thickness times the material's refractive index. According to the conventional theory of reflection for dielectric interfaces, the reflectivity for normally incident light is given by $$R_{\lambda/4} = \left[ \frac{n_1^2 - n_0 n_s}{n_1^2 + n_0 n_s} \right]$$

Therefore, in order to achieve zero reflectivity (numerator set to 0), the ideal coating refractive index is equal to the square root of the refractive index of the substrate times the square root of the refractive index of surrounding medium. In most applications, this surrounding medium is air, which has a refractive index of 1. Therefore, if the refractive index of the coating material is exactly equal to the square root of the substrate refractive index, all surface reflection will be eliminated at the wavelength corresponding to 4 times the optical thickness. At other wavelengths, while the destructive interference from the reflected light from the top and bottom coating interfaces will not be complete, substantial reduction in reflection will still be obtained. For most applications, the optimal anti-reflection coating can be obtained by making the optical thickness one quarter of the mid-point of the visible wavelength range (one quarter of 5500 Angstroms or about 1400 Angstroms). It should be noted, however, that in certain circumstances, it may be desirable to reduce the reflection in a certain portion of the spectrum other than the midpoint. This can easily be done by slightly altering the process parameters.

The substrates described in this patent application have a refractive index of at least 1.49. Ideally, the refractive index of the coating material should fulfill the square root requirement mentioned above. For example, to optimally coat standard window glass, which has a refractive index of about 1.5, the coating material should have a refractive index of about 1.23. To coat many polyesters, which have a refractive index of about 1.66, the coating material should have a refractive index of about 1.29. While the terpolymers do not approach this ideal, their refractive index is sufficiently low to make them useful for anti-reflection coating applications. As an example of this, uncoated substrates with a refractive index of 1.5 have a reflectance of about 4% per surface at normal incidence. Preferably, reflections below 2% are desired, which corresponds to a refractive index of less than 1.41; more preferably, reflections below 1.5% are desired, which corresponds to a refractive index of less than 1.38.

Although single layer coatings are sufficient for many applications, they do have limitations. For example, the minimum reflectance, per surface, obtained by using a single terpolymer layer on crown glass is about 1.5%. In many circumstances, this may be unacceptably high. It is possible to even further reduce, and often completely eliminate, the minimum surface reflection by using multi-layer anti-reflection coatings, specifically two layer coatings. One of the trade-offs, however, is that the reflection rises rather sharply away from the wavelength of minimum reflectance. The creation of two layer coatings involves the application of a high refractive index layer onto the substrate surface, then subsequent application of a low refractive index layer on top. The refractive index of the high index layer must be greater than that of the substrate, while the refractive index of the low index layer must be lower than the substrate. It should be noted that solvent selection is extremely important, so that they are compatible with the substrate and do not redissolve the other coating layers.

Those skilled in the art will realize that unlike with single layer coatings, the thicknesses of each layer in a two layer coating can be modified over a relatively wide range to produce the desired anti-reflection coating. The optical thickness of high index layer is preferably about one quarter or one half wavelength, while the optical thickness of the low index layer is preferably about one quarter wavelength. In the most conventional two layer coating, each layer has an optical thickness of one quarter wavelength. Ideally, in this case, the coating materials are chosen such that the square of the refractive index of the high index material divided by the square of the refractive index of the low index material is equal to the refractive index of the substrate. If this is not possible, it is preferable that the index difference between each layer and the substrate be at least 0.1. Quantitative determination of the reflection properties of multilayer dielectric coating are well understood and known to those skilled in the art.

The refractive index of the anti-reflection coatings can be determined as follows: A 15-20 wt % solids solution of the polymer in an appropriate solvent is spin cast onto a clean silicon wafer at rotation speeds between 1500 and 3000 rpm. In general, this will yield a film thickness between 1 and 3 microns. The fluoropolymer coating is then cured in a convection oven at 150° C.±20° C. for 4 hours. However, it was found that the refractive indexes were unaffected with cure times as short as 10 minutes and as long as 24 hours. The room temperature refractive indexes of the polymers are then measured at 632.8 nm using a Metricon ® PC-2000 Prism Coupler.

The substrates used for anti-reflection coated devices include, but are not limited to, two major categories: inorganic oxides and plastics. Typical inorganic oxides include, but are not limited to, fused quartz, glass (all grades of optical glass as well as any and all common varieties), and sapphire.

Typical substrates include optical lenses; eyeglasses, both plastic and glass; windows, glass as well as polymeric windows, such as windows of clear polymeric vinyl (incl. copolymers thereof), styrene, acrylics (such as Plexiglass) or polycarbonate (Lexan ®) supplied by General Electric); clear polymer films such as vinyl (incl. copolymers), nylon, polyester, derivatized cellulose, and the like; the exterior viewing surface of optical (electro-optical) flat panel displays, such as liquid crystal displays of all types, ac plasma displays, dc gas discharge displays, electroluminescent displays, light emitting diodes, vacuum fluorescent displays, and the like; cathode ray tubes (e.g. video display tubes for televisions and computers) and the like; the surface of glossy displays and pictures, such as glossy prints and photographs, and the like; and optical indicator components, such as dials, knobs, buttons, windows and the like in environments where reflections are a problem such as aircraft interiors, aircraft cockpits, automotive interiors and the like.

The following describes typical procedures for applying the anti-reflection coatings to make the devices of the present invention. This description is illustrative only, and subject to modification from case to case to optimize coating quality and/or to accommodate different materials, as is within the skill of the art.

Prior to the coating operation, the substrates are scrubbed clean with methanol in an ultrasonic cleaner for at least 30 seconds. Upon removal, they are sprayed with fresh methanol to insure that no contamination remains on the surface. After being blown dry with filtered nitrogen air, the substrates are baked in an convection oven for about 5 minutes at about 100° C. to remove any residual moisture. No additional surface treatment steps are necessary before applying the coatings.

The substrates may be coated either by spin coating or dip coating from solutions of the polymers described above. Flexible substrates, such as nylon or polyester (Mylar) films are preferably dip coated. Rigid substrates may be coated using both methods. The polymer solution concentrations needed for these applications varied depending upon the specific polymer, its molecular weight, and the solvent used. In general, workable polymer concentrations are in the range of 0.5 wt % to 2 wt % solids for spin coating and 3 wt % to 8 wt % solids for dip coating. It should be noted that for dip coating, polymer concentration variations of 0.1% were found to alter the thickness of the film on the order of 100 Angstroms.

The dipping can be performed using a Newport Corporation Actuator 850 motorized micrometer attached to a translation base, typically employing a stage range of 1 inch. The actuator may be controlled by a Newport Programmable Controller 855C. Substrates are dipped into and pulled out of polymer solution at rates between 100 and 400 microns/second, where faster pulling rates correspond to thicker films. As an approximate rule, the thickness of the pulled film increases linearly with the pulling rate. In our operation, the polymer solution was contained in a vial that was, at most, half full. This allowed for the upper half of the vial to have a semi-solvent atmosphere, giving the film time to dry slowly. Dip coating needed to be done in an area with no drafts, since the air currents tended to create streaks on the substrates by causing substrate motion and inhomogeneous drying. Unless special precautions are taken, dip coating yields polymer films on both sides of the substrate.

The spin coating may be performed using a Headway Research photoresist spinner. In our operation, the spinner was enclosed in a Plexiglass box with a laminar flow hood mounted on top. Filtered nitrogen air was used to purge the spinning chamber and keep it reasonably dust-free. Samples were spun cast at rotation speeds between 1500 and 3000 rpm.

All initial samples on non-polymeric substrates were cured in a convection oven at 150° C. for 4 hours. It was found, as with the refractive index measurements, that curing times ranging from 10 minutes to 24 hours did not affect the overall optical properties of the films. Subsequent samples were therefore cured at temperatures between 100° C. and 150° C. for up to 1 hour. For two-layer films, the initial layer was cured for at least half an hour before the second layer was coated. It will be recognized that other curing means can be employed, including infrared lamps, hot bars, microwave radiation, infrared lasers, as well as other sources of thermal stimulation.

The thicknesses of the anti-reflection films were measured using two different methods. For glass substrates, a Sloan Dektak IIA profilometer was used not only for the thickness measurements, but also for an evaluation of the surface roughness. A measure of the thickness could also be inferred from the transmission in the spectral data of the anti-reflection coated sample. Since there was a high degree of correlation between the theoretical model and the experimental data, it was possible to obtain a highly accurate thickness measurement by matching the experimental wavelength of minimum reflection with the theory. This latter method was used exclusively with the plastic substrates.

All transmission and reflection measurements of anti-reflection coated samples were done using a Perkin-Elmer Model 330 spectrophotometer. The normally incident transmission measurements were done relative to air. Many of the plastic substrates contained dyes, microcrystallites, or surface machine grooves that were not removed after manufacturing. It was therefore often difficult to infer absolute reflectivity from the transmission spectra. Reflectance spectra were taken relative to a freshly aluminized quartz slide and calibrated by measuring the reflectance from a clean quartz slide. Due to the geometry of the apparatus, the probe beam had a 6. angle of incidence on the sample.

Glass (of any type, incl. optical glasses as well ordinary window glass), quartz, and oxide crystals, such as sapphire, are rigid substrates that are impervious to all organic solvents. They are, therefore, the most easily processable. Anti-reflection coated samples are conveniently prepared via either spin coating or dip coating, followed by curing at elevated temperature. Since sapphire has a very high refractive index, the amount of reflected light can be significantly reduced by simply using a single layer anti-reflection coating with materials having a refractive index of approximately 1.38. A 1000 Angstrom thick film of above-described terpolymer was spin coated onto both sides of a sapphire substrate and fully cured at 160° C. for four hours to allow for full crosslinking. Transmission spectra were taken for both the coated and uncoated samples. The results are shown FIG. 1.

Unlike sapphire, both quartz and microscope glass have relatively low refractive indexes. While the reflection can be significantly reduced by applying a single terpolymer layer of the appropriate thickness, it may be advantageous to use a two layer coating. As stated earlier, the bottom layer consists of a high refractive index material and the top layer consists of a low refractive index material. The words "high refractive index" and "low refractive index" are referenced relative to the refractive index of the substrate.

In general, each layer in a two layer anti-reflection coating can have a rather wide range of thicknesses. In the most common embodiment, however, each layer has an optical thickness of one quarter wavelength. The high index layer can be made from a wide range of materials, such as poly (9-vinyl carbazole) which has a refractive index of approximately 1.67. This polymer readily dissolves in many common solvents, such as cyclohexanone.

As an example of the advantages of two layer coatings, consider a substrate with a refractive index of 1.5. The bare substrate would have a reflectance of 4% per surface at normal incidence. If a single layer coating, with a refractive index of 1.38, were applied at a quarter wavelength optical thickness, the reflectance would decrease to 1.4% per surface at 5500 Angstroms. If the substrate had a two layer coating, low index layer with a refractive index of 1.38 and high index layer with a refractive index of 1.67, both with an optical thickness of one quarter wavelength, the reflectance would decrease to 0.03% per surface at 5500 Angstroms.

The anti-reflection coating process described above can also be applied to polymeric materials. In particular, materials that do not dissolve or swell in the solvent systems used for the coating materials, such as cured epoxies, cured polyurethanes, etc. can be readily coated. Other polymeric materials such as Lexan® (polycarbonate), plexiglass (thermoplastic acrylics), and the like may be dissolved or swelled by the mixed solvent system described above. In these cases, an alternate coating mechanism will need to be employed, such as the use of a different solvent system, melt processing, or water based emulsion. In general, when the solubility parameter $\delta$ of the solvent or solvent mixture of the coating is different from (either larger or smaller) the measured or calculated solubility parameter of the substrate by more than about 1 $(MPa)^{\frac{1}{2}}$, then the solvent mixture will not dissolve the substrate.

For example, the $\delta_{solvent}(MPa)^{\frac{1}{2}}$ for tetrahydrofuran (THF) = 18.6, 1:1 THF/hexafluoroxylene (HFX) = 17.2.

Accordingly, the following solubilities will be observed:

| Solvent | Substrate | $\delta_{substrate}$ | Result |
| --- | --- | --- | --- |
| THF/HFX | PET | 21.9 | no effect |
| THF/HFX | nylon 66 | 27.8 | no effect |
| THF/HFX | PTFE | 12.7 | no effect |
| THF | PVC | 19.3 | soluble |
| THF/HFX | PVC | 19.3 | insoluble |
| THF | polystyrene | 17.6 | marginally soluble |
| THF | poly(methyl methacrylate) | 18.6 | highly soluble |
| THF | PTFE | 12.7 | insoluble |
| THF | polyvinyl alcohol | 25.8 | insoluble |

Incidentally, the solubility parameter $\delta$ for a terpolymer as above described, wherein s:t:u=80:10:10 is 17.3, so that that terpolymer is soluble in 1:1 THF/HFX.

Both single layer and two layer effective anti-reflection coatings were made on flexible polymer films via dip coating. The substrate materials included nylon 6, and polyester (Mylar).

Exemplary optical devices of the present invention are eyeglass lenses and liquid crystal displays provided with an anti-reflection coating of the above-described terpolymer, applied as herein described.

Example 3

Most common eyeglass lenses are made out of glass (n=1.51) or a hard crosslinked polymer resin (n=1 51), although there is a move toward higher refractive index materials to reduce the required curvature. In both cases, the materials do not dissolve in any of the solvents used for the above-described polymer compositions. Both single layer and two layer anti-reflection coatings were applied to both types of lenses via spin coating. Transmission spectra were taken for both uncoated and coated low positive diopter lenses. We observed about 97% transmission for a single layer coated lens and greater than 100% transmission for a two layer coated lens, both at their respective design wavelengths (the wavelength of minimum reflection). In comparison, an uncoated lens exhibited about 92.5% transmission. The percentages are slightly elevated relative to flat substrates due to lensing of the probe beam. There were negligible differences between the glass and resin lenses.

Example 4

Both single layer and two layer anti-reflection coatings were applied to liquid crystal displays via dip coating. In particular, we used a 4 digit, 24 pin device. To ensure that the pins were not covered with polymer, they were encapsulated in a thick layer of rubber cement. The cement did not appear to dissolve in tetrahydrofuran, hexafluoroxylene, or cyclohexanone. The first LCD was dip coated in a solution of a terpolymer composition as above described and cured at 100° C. for 30 minutes. The second LCD was initially dipped in polyvinylchloride solution (~5% by weight PVC in cyclohexanone), baked at 100° C. for 60 minutes, then in the terpolymer solution and again cured at 100° C. for 30 minutes. The rubber cement was then peeled off. Visually, there was a marked decrease in the reflected light. There was also the characteristic bluish color reflected from the LCD with a two layer coating. This bluish hue is the consequence of the rather high reflectivity in the blue and the comparatively low reflectivity throughout the remainder of the visible spectrum.

Example 5

Figure 6:
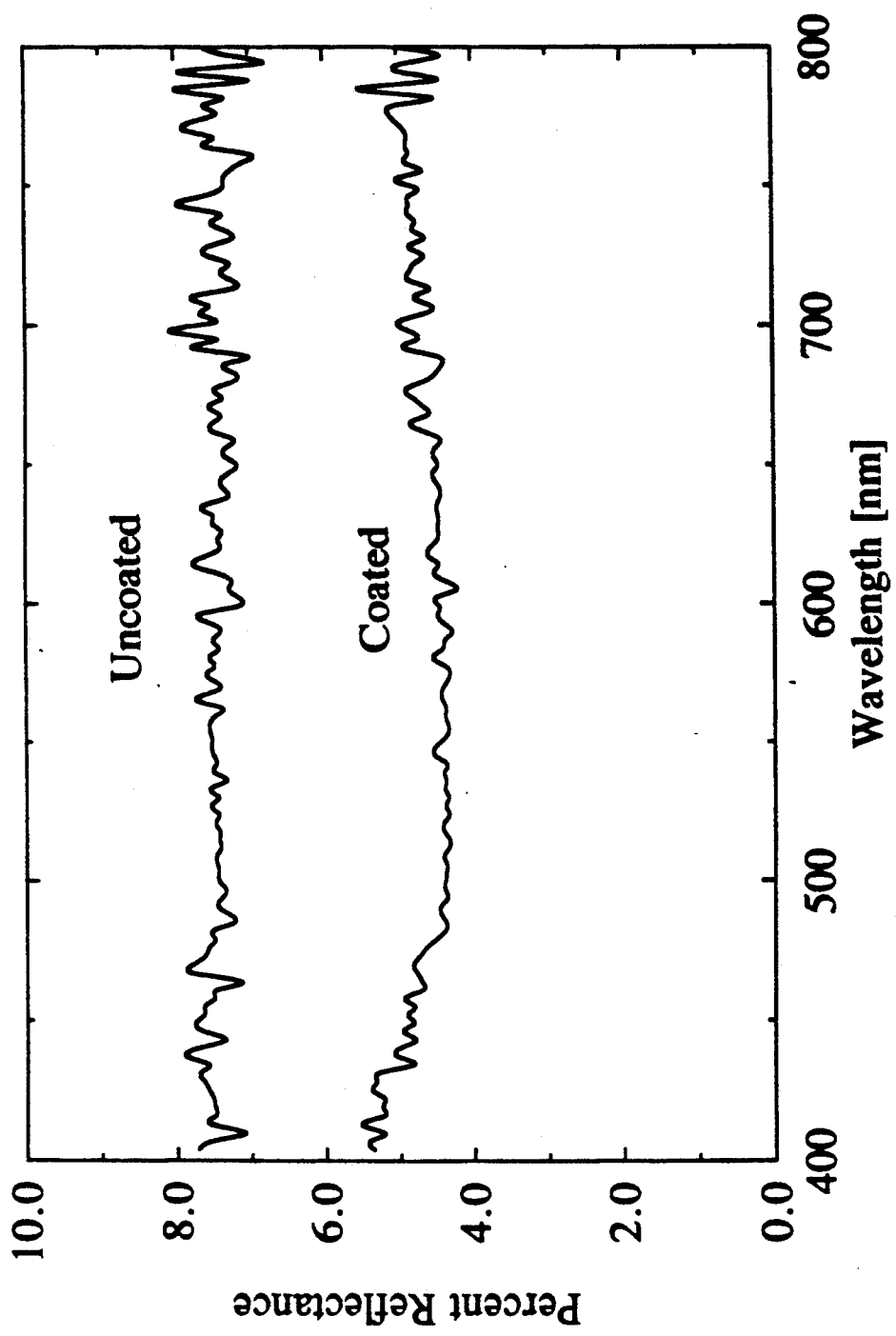
FIG. 6 represents a graph showing the total reflectance from an uncoated and coated black and white glossy photographic print having a uniform black image (1000 Angstrom layer of the terpolymer was dip coated onto the photograph).

When a glossy photograph is viewed under normal lighting conditions, a small, though significant, portion of the light is reflected back, making the color and the image appear "washed out". To minimize this problem, it is usual practice to use a mat surface finish. This, however, reduces the resolution of the image. We have demonstrated that an anti-reflection coating of a thin layer of the above-described terpolymer when applied to a glossy photograph significantly reduces specular reflection. A glossy black and white photograph containing a uniformly black image was partially coated with the terpolymer described above via dip coating. The total reflectance, both specular and-diffuse, were measured using a Perkin Elmer 330 spectrophotometer equipped with an integrating sphere. Measurements were perform on both the uncoated and coated sections of the photograph at a 7° angle of incidence. The data, shown in FIG. 6, demonstrates the substantial decrease in reflectance.

A further effective application of the anti-reflection coated optical devices of the present invention involves their use as transparent covers for read-out instruments and instrument panels, such as automotive instrument panels. Such panels are commonly tilted, or curved, to reduce back reflected light. Tilting or curvature tend to reduce overall visibility, and to increase the size of the component. Application of an anti-reflection coating of the above-described terpolymer composition effectively reduces reflection and increases instrument visibility.

Besides spin coating and dip coating, as above described, the anti-reflection coating may also be applied by spray coating and roller coating. In the former, a fine mist of polymer solution is sprayed onto the substrate in a semi-solvent atmosphere and allowed to dry slowly. There are numerous parameters that need to be controlled in order to use this technique: solution viscosity, mist particle size, substrate movement speed, spray area overlap, and sample orientation. In the latter, roller coating, a squeege (similar to that used in screen printing) is used to apply a uniform thin polymer layer.

Figure 2:
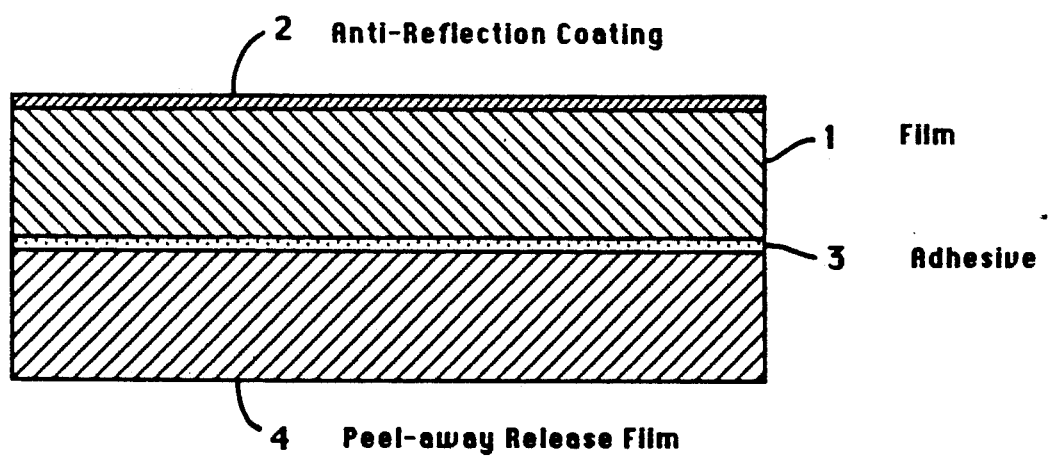
FIG. 2 illustrates construction of a transferable anti-reflection coating comprising an adhesive-backed optically clear polymer film having an anti-reflection coating.

There are some difficulties in applying a thin polymer layer of uniform, predetermined thickness to large curved objects. A transferable anti-reflection coating could provide a solution. In accordance with the present invention, this is accomplished by the provision of structure (here referred to as "appliqué") comprising an optically clear plastic film, such as polyester (Mylar) which is anti-reflection coated on one side, with an refractive index matching adhesive on the other side, as is illustrated in FIG. 2. As shown in FIG. 2, an optically clear plastic film 1 has an anti-relection coating 2 applied to one side, and an adhesive coating 3 on the opposite side. The adhesive coating 3 is backed with peel-away release film 4, which may be conventional release-coated paper. For application, the release film is peeled off, and the anti-reflection coated highly transmissive optical film is applied to the viewing surface of flat surface displays (as enumerated, supra.), CRT's, VDT's, eyeglasses, etc. This alleviates the problem of trying to coat cumbersome objects. If damaged, the appliqué can easily be removed and replaced. Preparation of such an appliqué is illustrated by Example 6, below:

Example 6

Cleer-Adheer® sheet (C-Line Products, Des Plaines, Ill.) was used as the base for an applique, The sheet consists of a mylar film backed with a pressure-sensitive acrylate adhesive and peel away release paper. The entire laminating sheet was dip coated with a solution in tetrahydrofuran-hexafluoroxylene of above-described terpolyer and baked at 100° C. for 30 minutes. The solvent mixture very slowly dissolved some of the adhesive. That portion of the film was cut off. Visually, there was a significant difference in light transmission and optical clarity between the uncoated and coated sections.

Example 7

A 0.05 mm thick clear security Llumar Film (All Purpose Glass Coating Co., Clifton, N.J.), consisting of a polyester film backed with a pressure sensitive adhesive and a peel-away plastic backing film, was used as the base for an appliqueé. A 20×25 cm sheet of this film was laid flat on one side of a wet glass sheet. The water permitted easy movement of the film until it was placed in the proper position. Using a soft cloth, the water was pressed out, leaving an adhesive/glass interface. The same process was repeated on the other side of the glass. The glass sheet so treated on both sides was allowed to dry at room temperature for 24 hours, after which time it was baked at 60° C. for 4 hours. The resultant coated glass sheet was clear and free from air bubbles. The surfaces were cleaned with soap and water, followed by drying at 100° C. for 10 minutes. Both sides of the laminated glass sheet were then dip coated with a THF/HFX solution of above-described terpolymer and baked at 100° C. for 30 minutes. There was a significant enhancement of optical transmission, as measured using a Perkin Elmer 330 spectrophotometer. The average total reflectance near 5500 Angstroms for the coated, laminated glass was approximately 4.5%, as compared to about 8.5% for the bare glass. The clarity enhancement was not quite as great as that obtained on a bare glass sheet coated with the terpolymer, possibly due to slight index mismatches between layers.

Example 8

A film as described in Example 7, above, is dip coated with the THF/HFX terpolymer solution employed in Example 7. It is permitted to dry and is then baked at 125° C. for 1 hour to cross-link the terpolymer. Thereafter, the film is permitted to cool to room temperature, the backing film is peeled away, and the film without the backing sheet is placed on a wet glass sheet and properly positioned. The water is then squeezed out using a soft cloth, and the structure is permitted to dry at room temperature for 24 hours, followed by baking at 100° C. for 4 hours. The laminated glass sheet thus obtained exhibits significant optical clarity and increased light transmission.

Every application has its own glare reduction requirements. Since it is not possible to attain zero reflectance across the entire spectrum, each application must be analyzed to choose the optimal coating. The goal of minimizing the total reflectance can be achieved by numerically calculating the integral $$TR = \int_\lambda R(\lambda) I(\lambda) S(\lambda) d\lambda$$

where TR is the total reflectance, $R(\lambda)$ is the spectral reflectance vs. wavelength, $I(\lambda)$ is the spectral intensity distribution vs. wavelength, $S(\lambda)$ is the spectral sensitivity of the detector vs. wavelength, and $\lambda$ is the wavelength. Ideally, the reflectance minimization is accomplished by reducing the reflectance in the wavelength region where $I(\lambda)S(\lambda)$ is large.

Figure 3:
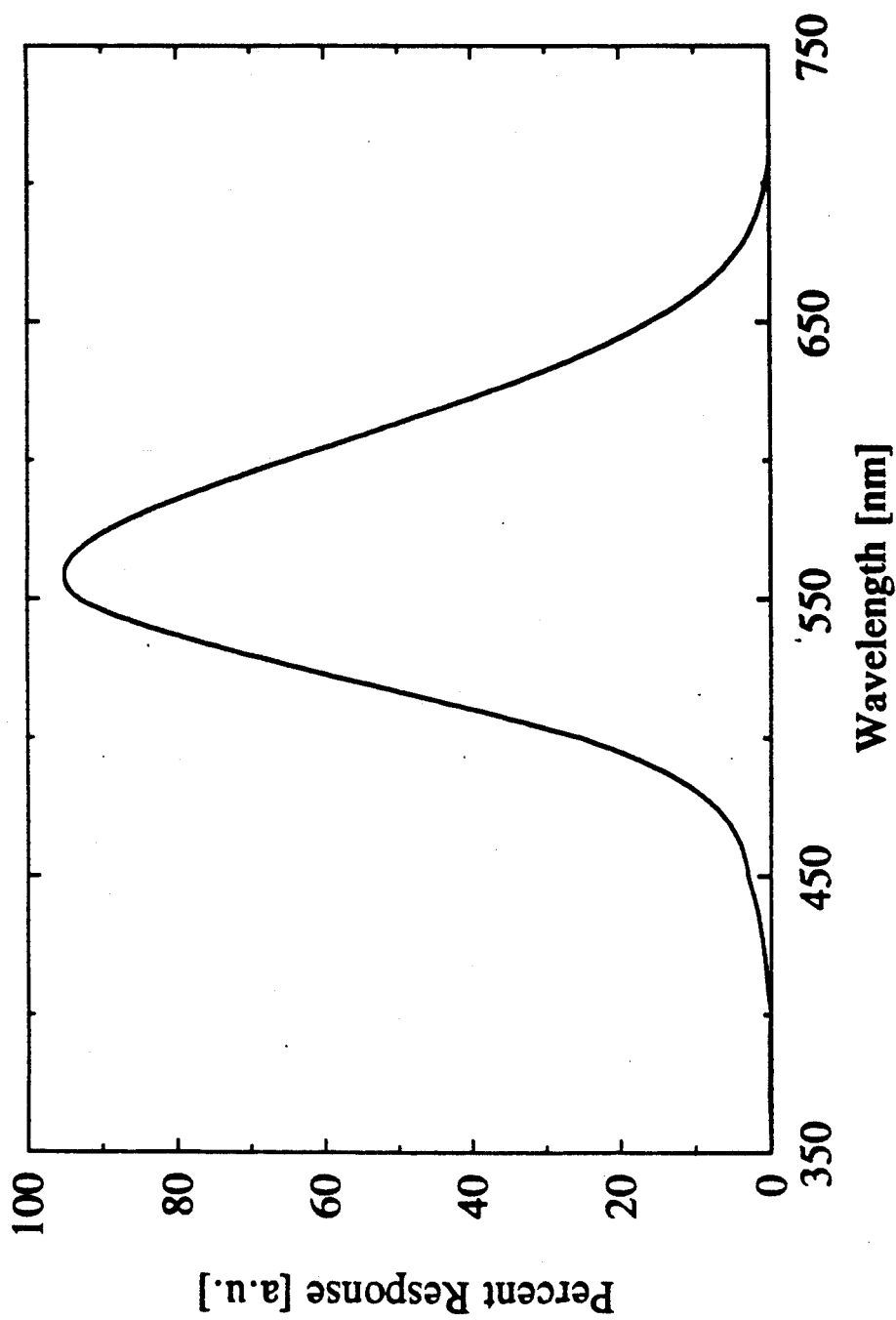
FIG. 3 is a curve illustrating the response spectrum of a normal daylight adjusted human eye.
Figure 4:
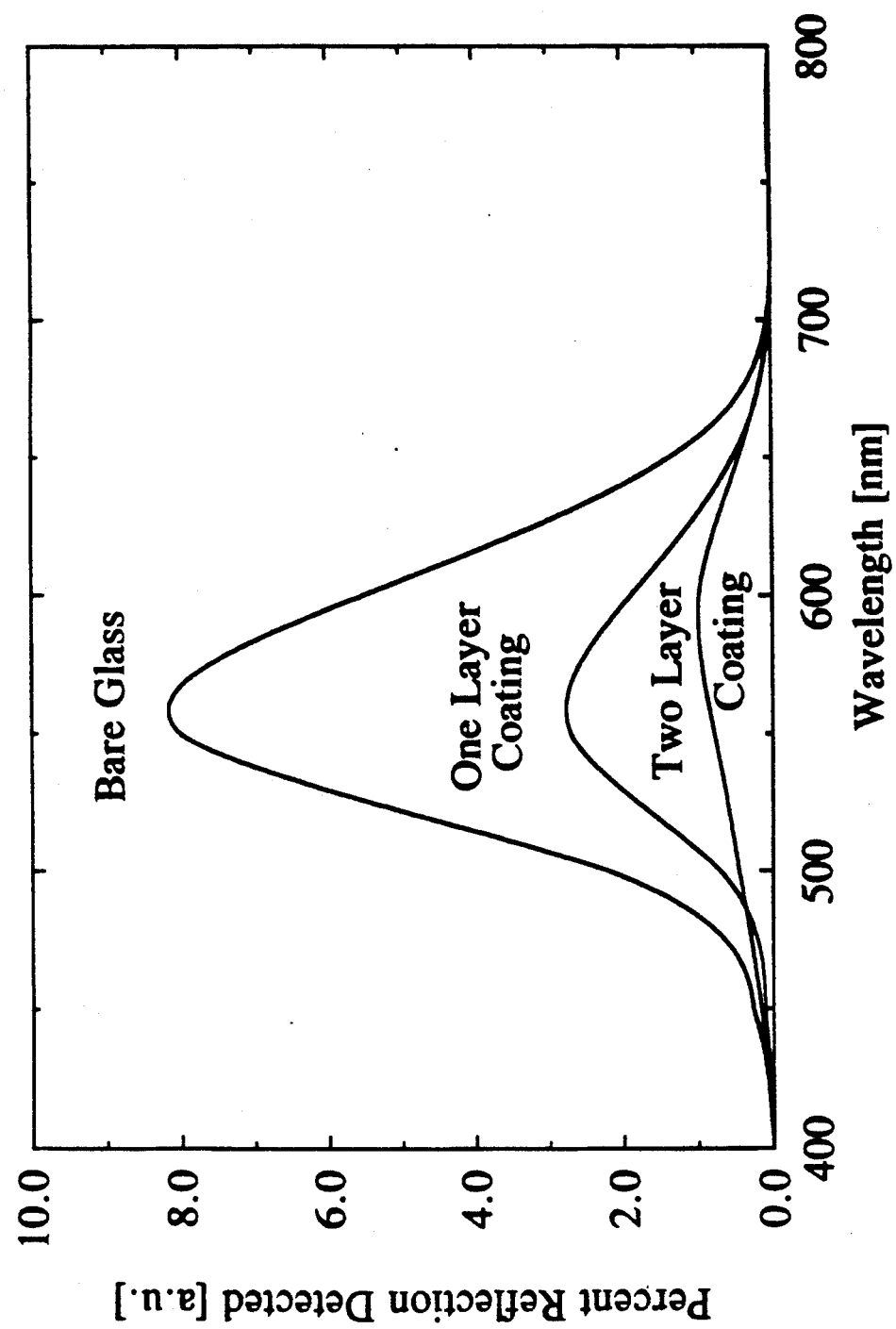
FIG. 4 is a curve showing the reflectance detected by the human eye from a reflective surface having an anti-reflection coating deposited thereon.
Figure 5:
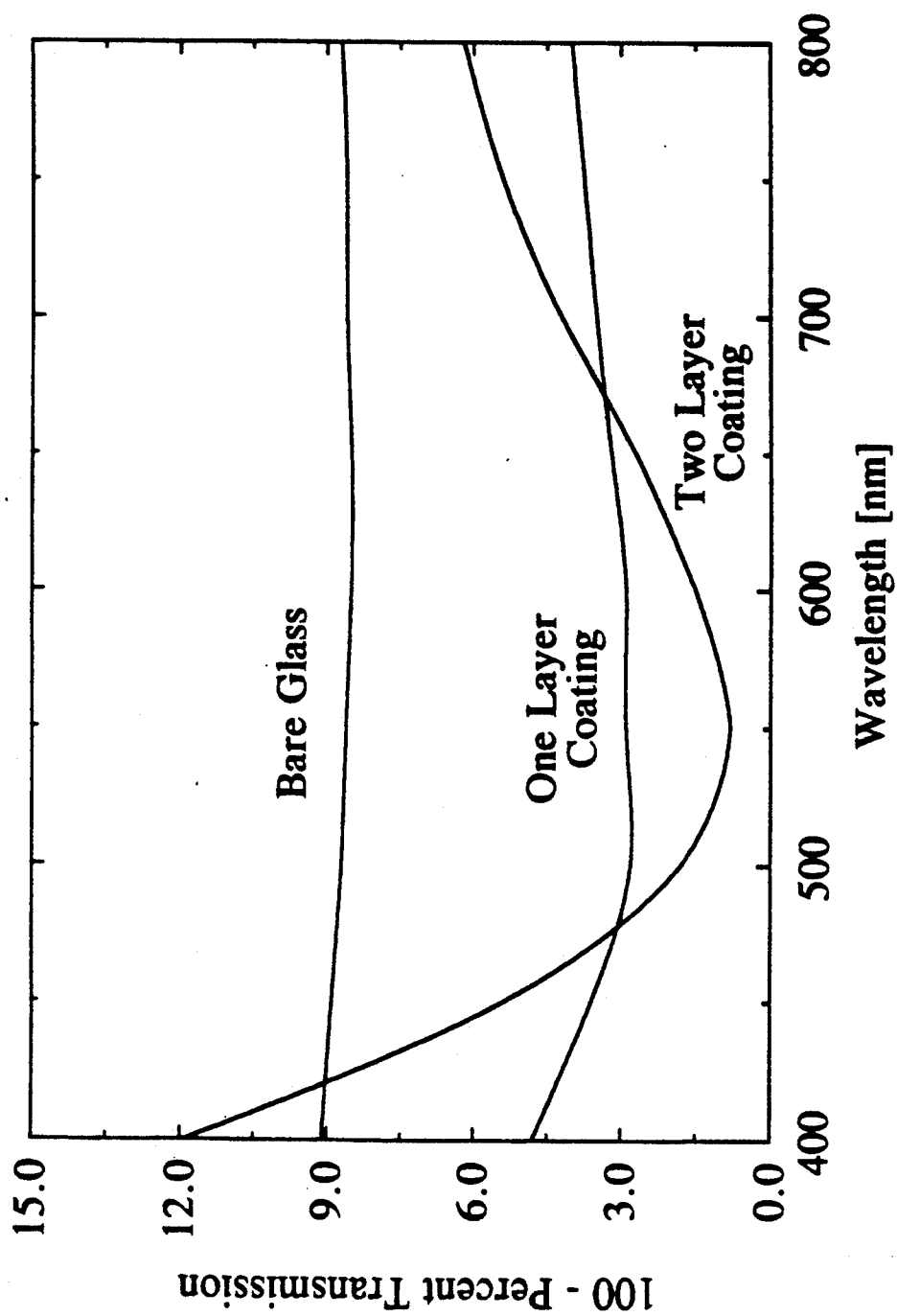
FIG. 5 is a graph illustrating measured single surface reflectance (100 − % transmission) vs. wavelength for an uncoated, single coated and double coated glass substrate.

The effect of the choice of detector is shown using data from the results section. For most commercial applications, the detector is the human eye. In FIG. 3, a sensitivity curve is shown corresponding to a normal daylight-adjusted eye [M. Alpern, "The Eyes and Vision," in *Handbook of Optics*, W. G. Driscoll et al., Eds., New York: McGraw-Hill, 1978]. Curves corresponding to eyes that are night-adjusted or have ocular problems are also available and may be appropriate for certain applications [ibid.]. We assume that under ambient room lighting conditions, the light intensity distribution is reasonably uniform across the entire visible spectrum. Corrected reflectance curves, using the data from FIG. 5, are shown in FIG. 4.

We have qualitatively evaluated the adhesion and mechanical properties of the polymers. The degree of adhesion was measured using two different methods. The first method involved using a pencil eraser to push the polymer film off the substrate. The other method used was the standard Scotch ® tape test. For this, crosshatches were made in the film using a razor blade. Scotch ® tape was pressed onto the polymer and quickly pulled off. The scratch resistance was determined by repeatedly wiping the polymer film with a Kim-wipe ®.

The uncured fluoroterpolymer has relatively poor adhesion and durability. Upon curing, however, it was not possible to remove the film using the two tests mentioned above. In fact, the polymer could not be removed without physically abrading or scratching the film. No noticeable scratches were observed after wiping the film repeatedly.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. The method of providing an anti-reflection coating on a solid body having a reflective surface, which comprises depositing on said surface a layer of a polymeric composition comprising fluorinated copolymer having a polymer chain composed of

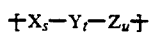

units, wherein s, t and u represent weight proportions of the respective X, Y and Z units, and have values within the ranges of s = from about 0.5 to about 0.99;
t = from about 0.005 to about 0.495; and
u = from about 0.005 to about 0.495;
with the sum of s+t+u being 1;

X represents units of the composition

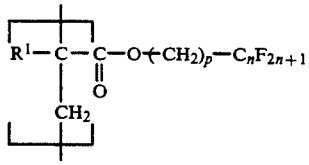

wherein
$R^1$ is H, —CH$_3$, or mixtures thereof;
p is 1 or 2;
n is an integer of from about 1 to about 40;
Y represents units of the composition

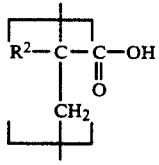

wherein
$R^2$ is H, —CH$_3$ or —CH$_2$COOH;
Z represents units of the composition

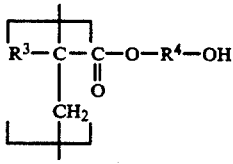

wherein
$R^3$ is H, —CH$_3$, or CH$_2$COOC$_m$H$_{2m+1}$, wherein m is an integer of from about 1 to about 4, and '$R^4$ is an alkylene bridging group, straight chain, branched or cyclic, having from 1 to about 8 carbon atoms;

wherein the X, Y and Z units may be arranged in any sequence.

2. The method of claim 1 further comprising heating said layer of a polymeric composition at a temperature between about 120° C. and about 180° C. for time sufficient to effect cross-linking of said fluorinated copolymer.

3. The method of making an anti-reflection coated body according to claim 1, which comprises applying a solution of said fluorinated copolymer to said reflective surface, and evaporating the solvent.

4. The method of claim 3, further comprising heating the resultant coating at a temperature between about 120° C. and about 180° C. for time sufficient to effect cross-linking of said fluorinated copolymer.

5. The method of claim 3, wherein the solution of said copolymer is applied by spin-coating.

6. The method of claim 3, wherein the solution of said copolymer is applied by means of dipping said solid body into said solution.

7. The method of claim 4, wherein said solid body is transparent.

8. The method of claim 1, comprising the steps of depositing two layers of anti-reflection coatings, wherein the first layer which is in direct contact with said body comprises a polymer having a refractive index higher than the refractive index of said body, and the second layer has a lower refractive index than said body.

9. The method of claim 8 involving the step of applying a solution of said fluorinated copolymer to the first layer, and evaporating the solvent.

10. The method of claim 9 further comprising heating the second layer at temperature between about 120° C. and about 180° C. for time sufficient to effect cross-linking of the fluorinated copolymer.

* * * * *